United States Patent
Walker

[15] 3,698,728
[45] Oct. 17, 1972

[54] FLUID SEALING DEVICE
[72] Inventor: James V. Walker, Redondo Beach, Calif.
[73] Assignee: McDonnell Douglas Corporation
[22] Filed: Jan. 7, 1971
[21] Appl. No.: 104,750

Related U.S. Application Data
[63] Continuation of Ser. No. 863,658, Oct. 3, 1969, abandoned.

[52] U.S. Cl. ............... 277/165, 277/177, 277/188, 277/206
[51] Int. Cl. ............................................. F16j 15/10
[58] Field of Search......277/165, 206, 180, 164, 205, 277/207–211, 84, 188, 177

[56] References Cited

UNITED STATES PATENTS

| | | | |
|---|---|---|---|
| 2,204,507 | 6/1940 | Martin | 277/206 |
| 2,324,688 | 7/1943 | Finlayson et al. | 277/206 |
| 2,345,515 | 3/1944 | Tweedale | 277/206 |
| 3,302,953 | 2/1967 | Glasgow | 277/180 |
| 2,789,847 | 4/1957 | Jackson | 277/84 |
| 2,915,349 | 12/1959 | Gomberg | 277/165 |
| 3,114,561 | 12/1963 | Creath et al. | 277/205 |

FOREIGN PATENTS OR APPLICATIONS

| | | | |
|---|---|---|---|
| 1,083,933 | 9/1967 | Great Britain | 277/165 |
| 1,350,831 | 12/1963 | France | 277/206 |
| 738,055 | 10/1955 | Great Britain | 277/165 |

OTHER PUBLICATIONS
Slipper Seals: O–Rings with "Teflon" for Low Wear in The Journal of Teflon Vol. 5, No. 4, May 1964, pp. 7.

Primary Examiner—William F. O'Dea
Assistant Examiner—Robert I. Smith
Attorney—Walter J. Jason, Donald L. Royer and Ming Y. Moy

[57] ABSTRACT
An improved fluid seal designed for precluding leakage of fluid between two mating surfaces. The seal includes a back-up device and a pressure loading element. The back-up device is shaped like a ring having an outer ring portion and two side flanges integral with the inner periphery of the outer ring portion and extending radially inwardly therefrom. The side flanges are spaced apart from each other to define an inwardly facing annular channel for retaining the pressure loading element. The seal may be easily installed in a groove formed in one of the mating surfaces to prevent leakage.

8 Claims, 5 Drawing Figures

PATENTED OCT 17 1972

3,698,728

INVENTOR.
JAMES V. WALKER
BY Ming Y. Moy
- ATTORNEY -

FLUID SEALING DEVICE

This application is a continuation of application Ser. No. 863,658 filed Oct. 3, 1969, and now abandoned.

BACKGROUND OF THE INVENTION

To provide a pressure seal between mating surfaces, it has previously been common practice to insert a layer of deformable packing material which is compressed when the surfaces are mated. However, seals formed in this manner are incapable of withstanding high pressure and the packing material can be used only once. To overcome these difficulties various improved sealing means have been developed. One such improved means includes a groove in one mating surface which is fitted with a resilient deformable packing member such as an O-ring. The deformable member is then deformed to lie entirely within the groove when the sealing means is used between the mating surfaces. The resilient packing member exerts a continual force against a mating surface and thereby forms an effective seal for preventing leakage of fluid under pressure. However, such seals require the mating surfaces be extremely flat. If local waviness or gapping is as much as 0.002 inch, seal extrusion will result and drastically limit seal life. Furthermore, if the fluid pressure is surging or cycling from high to low values, there is constant working or shifting of the seal portion of the packing member in accordance with pressure variance. Over an extended period of time this movement of the packing member causes abrasion and wear of the seal contact surface and leakage may occur. Also loss of resilience due to material fatigue may take place.

Installation problems have been encountered frequently in the use of the above-described sealing means since it is not capable of retaining itself in the groove prior to the mating of the surfaces. The capability of self-retention in the groove is extremely important during many assembly applications when the part containing the seal must necessarily be inverted to permit joining it to its mating part. In many cases where accessibility is limited, a face seal which is not positively retained in the groove may fall out during the surface joining operation without the fact even being detected. Thus, it is a direct improvement on the state of the art to provide a back-up device when used in combination with an O-ring face seal results in improved performance and reliability of the O-ring especially in higher pressure applications while at the same time it features automatic retention of both the back-up device and the O-ring in the sealing groove prior to final mating of the surfaces for which the seal is being provided.

SUMMARY OF THE INVENTION

In carrying out the principles of this invention according to one embodiment thereof there is provided an improved fluid seal for precluding leakage of fluid between two mating surfaces. One of the mating surfaces has an annular groove of substantially rectangular cross-section confronting the other surface with the fluid seal being installed in the groove.

The fluid seal includes a back-up device which is an annular ring fabricated of a relatively hard to deform material such as teflon. The annular ring has a cross-sectional configuration which is symmetrical about an axially central radius. The annular ring comprises an outer ring portion and two side flanges integral with the inner periphery of the outer ring portion and extending radially inwardly therefrom, the side flanges being spaced from each other to define an inwardly facing annular channel.

The fluid seal further comprises an annular pressure loading element fabricated of a resilient and easily deformable material and having its relaxed state a circular cross-sectional configuration. The pressure loading element is adapted to be placed in the annular channel formed intermediate the side flanges of the back-up device. The fluid seal may be easily installed in the annular groove and operated to prevent leakage of fluid under pressure intermediate the two mating surfaces.

The side flanges of the annular ring provide excellent protection for the pressure loading element while at the same time performing the additional function of capturing and retaining the pressure loading element intermediate therein. The present invention takes full advantage of the slight deformability of the teflon or teflon-like material from which the annular ring is made to effect a slight interference fit of the fluid seal in the annular groove formed in one of the mating surfaces, thus, permitting the sealing elements to be positively retained therein during assembly.

The combination of the present invention results in improved performance and reliability of the pressure loading element such as a conventional O-ring especially in higher pressure applications. The sealing device of the present invention also features automatic retention of the sealing elements in the annular groove prior to the final mating of the surfaces for which the seal is being provided. The automatic retention feature provides protection against inadvertant loss during assembly thereof.

DETAILED DESCRIPTION OF SHOWN EMBODIMENT

Figure 1:
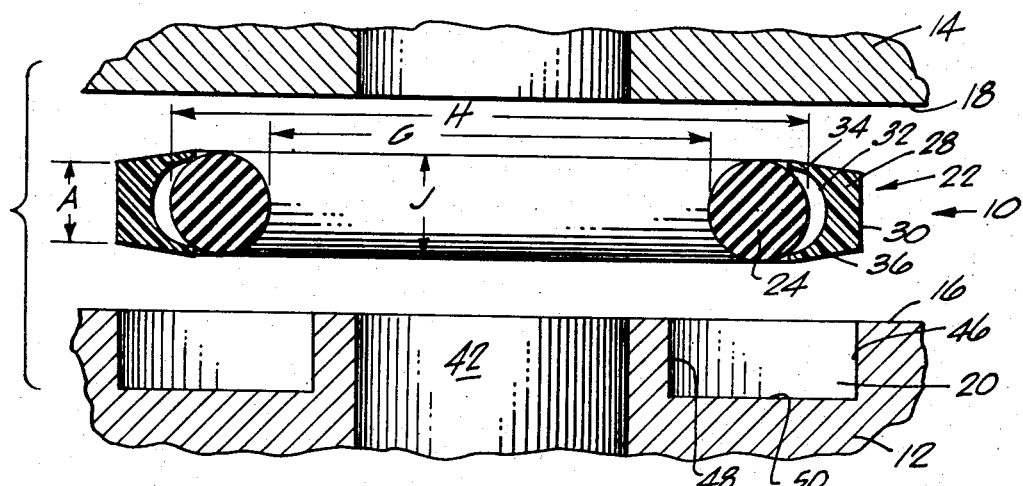
FIG. 1 is a central sectional view of two mating members utilizing an improved fluid seal according to the present invention.

There is shown in FIGS. 1 through 5 an improved fluid seal 10 for precluding leakage of fluid between two mating members 12 and 14. The mating member 12 has a substantially flat mating surface 16 which is provided with an annular groove 20. The groove 20 has a substantially rectangular cross-section and is adapted to receive and retain the fluid seal 10. The mating member 14 has a substantially flat mating surface 18 which confronts the mating surface 16. The fluid seal 10 includes an annular ring 22 and a pressure loading element 24.

The annular ring 22 has a cross-section that is symmetrical about an axially central radius. The annular ring 22 includes an outer ring portion 28 which is formed intermediate a cylindrical-radially outer surface 30 and a circularly concave, radially inner surface 32. The cylindrical outer surface 30 has a width A and defines a circle of a diameter B. The circularly concave, radially inner surface 32 has a radius R having its fixed end located on the line passing through the center of the dimension A perpendicularly thereto. The minimum radial distance between the concave inner surface 32 and the outer surface 30 is indicated as dimension C. The maximum radial distance between the concave inner surface 32 and the outer surface 30 and which is perpendicular to the width A is indicated as E. The annular ring 22 further includes side flanges 34 and 36 which are integral with the inner periphery of the outer ring portion 28 and extending radially inwardly therefrom. The flanges 34 and 36 are spaced from each other to define an inwardly facing annular channel 38 for reception of the pressure loading element 24. The diameter of the annular channel 38 is indicated as dimension F. Cylindrical, radially inner, end surfaces 40 which are parallel to the outer surface 30 are formed at the radially inner ends of the flanges 34 and 36 of the annular ring 22. The end surfaces 40 form a circle defining a diameter D. The distance N between the flanges 34 and 36 at their radially inner ends in their relaxed position thereof is slightly greater than width A of outer surface 30. In addition to providing excellent protection for the pressure loading element 24, the side flanges 34 and 36 perform the function of capturing and retaining the pressure loading element 24 in the channel 38.

It has been found to be of advantage to construct the annular ring 22 from teflon. However, other materials possessing similar characteristics would be satisfactory. The present invention takes full advantage of the slight deformability of the teflon to effect a slight interference fit of the fluid seal 10 in the annular groove 20, thus, permitting the seal 10 to be positively retained therein during assembly of the mating members 12 and 14.

Figure 2:
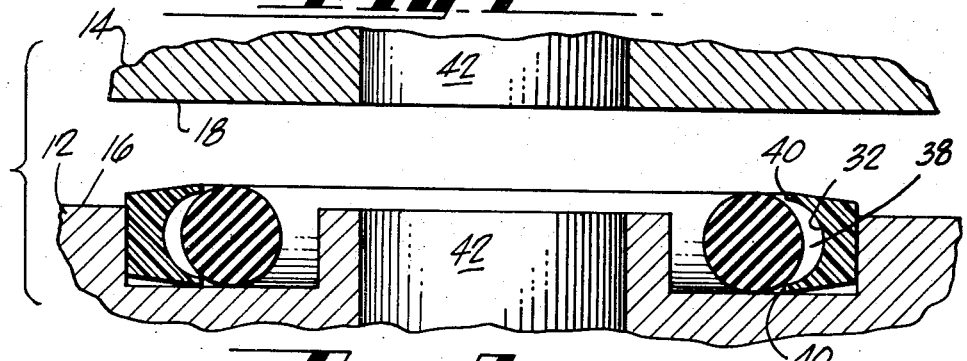
FIG. 2 is a view similar to FIG. 1 with the improved fluid seal being installed.
Figure 3:
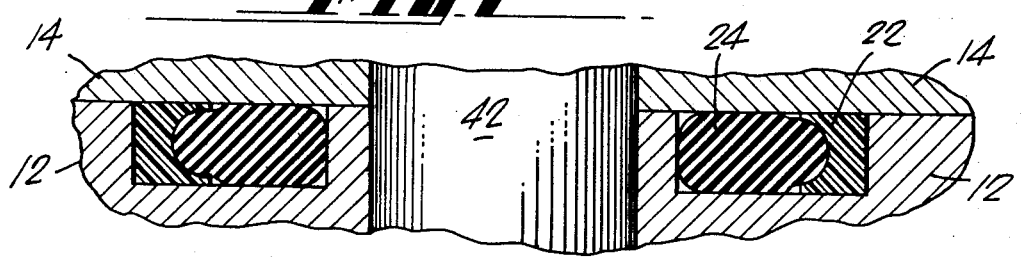
FIG. 3 is another view similar to FIG. 1 with the improved fluid seal installed intermediate two mating members.

The annular pressure loading element 24 as shown in FIG. 1, 2 and 3 is a conventional O-ring fabricated of a resilient and easily deformable material having its relaxed state a circular cross-section. The pressure loading element 24 is adapted to be placed in the annular channel 38 formed intermediate the flanges 34 and 36 of the annular ring 22. The conventional or standard O-ring 24 shown has an inner diameter G, an outer diameter H, and a circular cross-section of diameter J. Commercially available standard O-rings in accordance with military specification MS 28775, for example, may be used in this invention.

Figure 4:
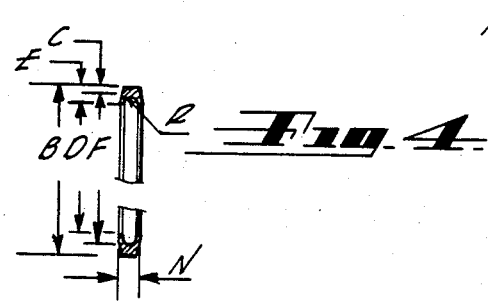
FIG. 4 is a central sectional view of a mating member shown in FIG. 1.
Figure 5:
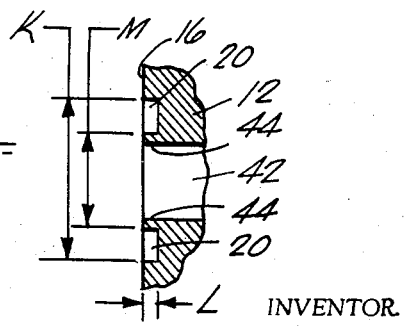
FIG. 5 is a central sectional view of the annular ring used in the improved fluid seal.

FIG. 4 is a central sectional view of the mating member 12 The annular groove 20 formed in the mating surface 16 of the mating member 12 has a substantially rectangular cross-section. The annular groove 20 is formed by a substantially flat bottom surface 50, a circularly concave radially inner surface 46, and a circularly convex radially outer surface 48. The surface 46 forms a circle having a diameter K, while the surface 48 forms a circle having a diameter M. The separation L between the bottom surface 50 and the mating surface 18 defines the depth of the groove 20. Integral with the mating member 12 and positioned intermediate the groove 20 and fluid passage way 42 is annular extension member 44 which serves the function of preventing dislodging of the O-ring 24 from the groove 20.

It is important to note that to enable automatic retention of the annular ring 22 and the O-ring 24 in the sealing groove 20 prior to final mating of the surfaces 16 and 18, the diameter B of the circle defined by the outer surface 30 of the annular ring 22 should be slightly greater than the diameter K of the circle defined by the circularly concave surface 46 of the sealing groove 20 into which it is installed. To obtain proper performance of the seal 10, the diameter F of the channel 34, after installation of the seal 10 in the groove 20, should be no less than the outer diameter H of the O-ring 24 with which it is used, and the radius R of the surface 32 should be approximately 40 percent of the cross-sectional diameter J of the O-ring 24.

To enable capturing and retaining the O-ring 24 within the annular channel 38, the diameter D of the circle defined by the end surface 40 of the annular ring 22 should be slightly less than the outer diameter H of the O-ring 24 which which it is employed. The dimensions of the radially inner end surfaces 40 should each be of a finite value to permit practicable machining or fabrication of the annular ring 22. Finally, the depth L of the annular groove 20 should be slightly smaller than the cross-sectional diameter J of the O-ring 24 and the distance N between the flanges 34 and 36 such that upon mating of the mating members 12 and 14, as shown in FIG. 3, the seal 10 is deformed and compressed to substantially fill the groove 20 thereby forming an effective seal.

The various dimensions of a highly effective and reliable series of fluid seals in accordance with this invention are shown in Table 1. This series utilizes standard size O-rings as specified in military specification MS 28775. It has been found that a fluid seal built according to dimensions shown in Table 1 has the capability of self-retaining in the sealing groove prior to final mating of the surfaces for which the seal is provided.

It should be noted that if the characteristics of the materials used in fabricating the annular ring 22 and the O-ring 24 respectively differ greatly from the usual teflon and rubber, the empirically derived relationships shown in Table I could be suitably modified somewhat to take into account such difference. However, the relationships are valid over extremely wide range of materials since the relationships are based largely on geometrical considerations of structure rather than material characteristics.

TABLE I

| Dash No. | O-ring dimension | | Annular ring dimension | | | | Groove dimension | | |
|---|---|---|---|---|---|---|---|---|---|
| | J | G | B ±.002 | C ±.002 | E ±.002 | N +.004 −.000 | K ±.003 | M | L ±.001 |
| 010 | .070 ±.003 | .239 ±.005 | .458 | .027 | .055 | .068 | .451 | .140/ .146 | .056 |
| 011 | | .301 | .520 | | | | .513 | .217/ .223 | |
| 012 | | .364 | .583 | | | | .576 | .286/ .292 | |
| 013 | | .426 | .645 | | | | .638 | .352/ .358 | |
| 014 | | .489 | .708 | | | | .701 | .418/ .424 | |
| 015 | | .551 | .770 | | | | .763 | .483/ .489 | |
| 016 | | .614 | .833 | | | | .826 | .546/ .554 | |
| 017 | | .676 | .895 | | | | .888 | .610/ .618 | |
| 018 | | .739 | .958 | | | | .951 | .673/ .681 | |
| 019 | | .801 ±.006 | 1.021 | | | | 1.014 | .738/ .746 | |
| 020 | | .864 | 1.084 | | | | 1.077 | .801/ .809 | |
| 021 | | .926 | 1.146 | | | | 1.139 | .861/ .871 | |
| 022 | | .989 | 1.209 | | | | 1.202 | .926/ .936 | |
| 023 | | 1.051 | 1.271 | | | | 1.264 | .988/ .998 | |
| 024 | | 1.114 | 1.334 | | | | 1.327 | 1.051/1.061 | |
| 025 | | 1.176 | 1.396 | | | | 1.389 | 1.113/1.123 | |
| 026 | | 1.239 | 1.459 | | | | 1.452 | 1.174/1.186 | |
| 027 | | 1.301 | 1.521 | | | | 1.514 | 1.236/1.248 | |
| 028 | | 1.364 | 1.584 | | | | 1.577 | 1.299/1.311 | |

What is claimed is:

1. A seal for precluding leakage of pressurized medium comprising:
   an annular pressure loading element fabricated of a resilient and easily deformable material in the shape of a ring having, in its relaxed state, a circular cross-section configuration; and
   an annular ring fabricated of a relatively hard to deform material with respect to the material of said element, said annular ring in its relaxed state having the cross-sectional shape of an isosceles trapezoid modified so the inner surface of said annular ring, which is the largest parallel surface, includes a circular surface defining a concave annular channel of a cross-sectional diameter less than the length of the largest parallel surface, said annular channel receiving and retaining said pressure loading element.

2. The seal defined in claim 1 wherein:
   said annular pressure loading element has an outer diameter not greater than the ring diameter of said annular channel.

3. The seal defined in claim 1 wherein:
   said annular ring is constructed from tetrafluoroethylene material.

4. A sealed joint comprising:
   a first member having a first substantially flat surface;
   a second member having a second substantially flat surface and an annular groove confronting said first surface; and
   a fluid seal installed in said groove for precluding leakage of fluid intermediate said first and second flat surfaces, said fluid seal comprising an annular pressure loading element fabricated of a resilient and easily deformable material in the shape of a ring having its relaxed state a circular cross-sectional configuration, and an annular ring fabricated of a relatively hard to deform material and having a cross-sectional configuration which is symmetrical about an axially central radius, said annular ring including an outer ring portion and two side flanges integral with the inner periphery of said outer ring portion and extending radially inwardly therefrom, said flanges being spaced from each other to define an inwardly facing annular channel, said flanges being adapted to receive and retain said pressure loading element in said channel.

5. The sealed joint of claim 4 wherein:
   said annular groove includes a substantially flat bottom surface parallel to and spaced from said second substantially flat surface, a circularly concave radially inner surface perpendicular to said bottom surface, said circularly concave radially inner surface defining a first circle of a first diameter; and
   said annular ring includes a cylindrical outer surface, said cylindrical outer surface defining a second circle of a second diameter, said second diameter being slightly greater than said first diameter thereby effecting a slightly interference fit of the fluid seal in the annular groove.

6. The sealed joint of claim 4 wherein:
   said annular pressure loading element has an outer diameter not greater than the diameter of said annular channel.

7. The sealed joint of claim 4 wherein:
   each of said side flanges has a radially inner end and said flange inner ends in their unstressed condition, are spaced apart a distance greater than the separation between said bottom surface and said second substantially flat surface.

8. The sealed joint of claim 4 wherein:
   each of said side flanges has a radially inner end and said radially inner ends of said side flanges define a circle of a third diameter, said third diameter being slightly smaller than the outer diameter of said annular pressure loading element.

* * * * *